(12) United States Patent
Ahonen

(10) Patent No.: US 7,180,535 B2
(45) Date of Patent: Feb. 20, 2007

(54) METHOD, HUB SYSTEM AND TERMINAL EQUIPMENT FOR VIDEOCONFERENCING

(75) Inventor: Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/016,429

(22) Filed: Dec. 16, 2004

(65) Prior Publication Data
US 2006/0132596 A1 Jun. 22, 2006

(51) Int. Cl.
H04N 7/14 (2006.01)

(52) U.S. Cl. .............................. 348/14.08; 348/14.01; 348/14.02

(58) Field of Classification Search .. 348/14.01–14.09, 348/14.11, 14.12, 14.13; 709/204; 370/260, 370/261
See application file for complete search history.

(56) References Cited

U.S. PATENT DOCUMENTS 5,764,901 A * 6/1998 Skarbo et al. .............. 709/204
5,953,050 A * 9/1999 Kamata et al. ........... 348/14.09
6,922,718 B2 * 7/2005 Chang ........................ 709/204
2002/0093531 A1* 7/2002 Barile ........................ 345/753

FOREIGN PATENT DOCUMENTS

| EP | 1178683 A2 | 2/2002 |
| EP | 1178683 A3 | 2/2002 |
| WO | WO-98/23075 A2 | 5/1998 |
| WO | WO-98/23075 A3 | 5/1998 |

* cited by examiner

Primary Examiner—Melur Ramakrishnaiah
(74) Attorney, Agent, or Firm—Harrington & Smith, PC

(57) ABSTRACT

The invention relates to method for videoconferencing, where videoconferencing signals are received as inputs of each including video- and audio streams in a plurality of downlink ports presenting participants' images and their speaking, where one participant is a speaker in turn; videoconferencing signal as an output is transmitted in an uplink port the signal including a video stream with a frame and an audio stream; participant's speaking is detected using a voice activity detection (VAD) for each communication channel; the video streams of the participants are combined into the frame according to the VAD.

5 Claims, 5 Drawing Sheets

METHOD, HUB SYSTEM AND TERMINAL EQUIPMENT FOR VIDEOCONFERENCING

BACKGROUND OF THE INVENTION

1. Field of the Invention

The present invention relates to method and hub system for videoconferencing comprising:

a) a plurality of downlink ports, each adapted to be coupled to a communication channel to receive videoconferencing signals from participants, therefrom each signal comprising video- and audio streams as inputs and presenting the participants' images and their speaking, where one participant is the speaker in turn;

b) an uplink port, adapted to be coupled to a communication channel to transmit videoconferencing signal thereto, comprising a video stream in a frame and an audio stream as an output;

c) an engine adapted to process the inputs to the output for a distribution to the uplink port;

d) a controller coupled to said engine for providing control signals thereto and having means for a voice activity detection (VAD) for each communication channel;

e) thereby selectively controlling the processing and distribution of videoconferencing signals at said hub in accordance with the voice activity detection.

The invention relates also to a terminal equipment for videoconferencing.

2. Description of the Prior Art

Video conferencing is used widely. Video calls are also used in 3G networks in cellular side. Voice activity detection (VAD) is used in speech coding systems.

Document WO 98/23075 discloses a hub for a multimedia multipoint video teleconferencing. It includes a plurality of input/output ports, each of which may be coupled to a communication channel for interchanging teleconferencing signals with remote sites. The hub has a plurality of signal processing functions that can be selectively applied to teleconferencing signals. Signal processing may include video, data, graphics and communication protocol or format conversion, and language translation. This system can handle multiple sites having incompatible communication standards.

Document EP 1178 683 discloses a multimedia attachment hub for a video conferencing system having a plurality of device ports that are physical ports for a plurality of multimedia devices and a terminal port that is a video conferencing terminal port providing a connection to a video conferencing terminal. This kind of system is applied when there are only two sites in videoconferencing.

The present systems select the video stream according to the voice activity detection. The video and audio streams of the speaker's communication channel are forwarded to other participants.

There remains a need for a system and a device that connects a plurality of participants in different sites and which also controls the video stream more user friendly. There is a need for a videoconferencing system enables the utilization of standard camera phones, particularly in video conference on top of 3G network.

SUMMARY OF THE INVENTION

The present invention provides a new method and a hub for more convenient videoconferencing. The invention provides also a terminal equipment having a hub for videoconferencing. The characteristic features of the invention are stated in the accompanying independent claims. In the described network there is a videoconference hub that all conference participants are connected to. The participants send video and audio information to the hub, which combines all video and audio streams together and one resulted stream is transmitted to all participants. The participant that is speaking is detected by VAD and the video stream of that party is used as main view while the others are scaled to small views. Here the term "main view" should be understood widely. It means usually "bigger view" but other enhancing is also possible like "color view" against "black&white view". It is much more convenient for the participant of the videoconference to see, not only the speaker but all other participants in other images.

The hub comprises an engine having at least one processor with a memory for processing received video streams with audio, and a voice activity detector for each video stream with audio for the detection of a speaker of one communication channel. Its audio is transmitted to all participants.

According to one embodiment the hub comprises means for recording processed video streams with audio. An indication about recording may be inserted into the frame in the video stream or form in each terminal equipment according to a chosen signal. According to another embodiment of the invention the means for recording are arranged in one terminal equipment.

DETAILED DESCRIPTION OF CERTAIN ILLUSTRATED EMBODIMENTS

Figure 1:
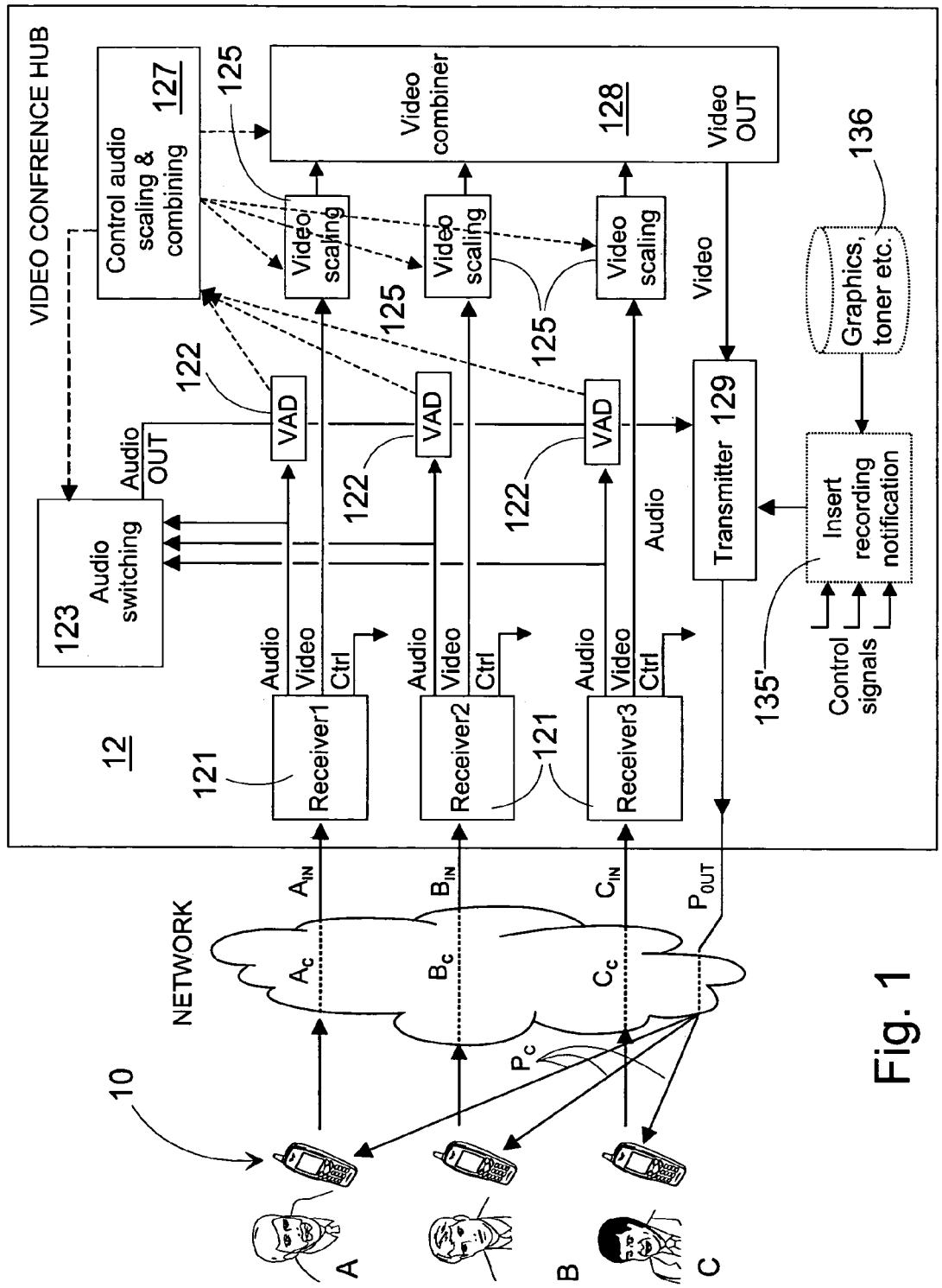
FIG. 1 presents a videoconferencing in a mobile network and a hub therein

FIG. 1 is a schematic view showing an example of an application environment for the method and a basic construction of the hub according to the invention. In this example the hub 12 has three downlink ports $A_{IN}$, $B_{IN}$, $C_{IN}$ and there are three participants A, B and C having a videoconference. Each of them has digital terminal equipment 10 with a camera, for example, a mobile terminal equipment, such as an advanced GSM telephone. These are able to send video stream with audio through downlink channels $A_C$, $B_C$ and $C_C$, respectively. They receive common video stream with audio from an uplink port $P_{OUT}$ through an uplink communication channel. In this embodiment all terminal equipments are connected to the hub through a packet transfer mode whereby the network refers to Internet. Instead of packet transfer mode circuit switching data transmission may be used between the terminals and the hub as well as their combination. In the packet transfer the hub needs only one (usually wide band) connection to the network. All inputs and output goes in the same channel. The circuit switching data transmission requires a physical connector for each participant in the hub.

The downlink ports $A_{IN}$, $B_{IN}$, $C_{IN}$ have each a receiver, which decodes video and audio streams as well as optional control signals. The video output of each receiver is connected to the video scaling unit 125 and the audio output to an audio switching unit 123 and also to a voice activity detection unit 122 (VAD). The VADs create control signals for a control unit 127. It controls the scaling units 125, audio switching unit 123 as well as the frame processing unit 128. A speaker in turn is detected by a respective VAD-unit 122, which then sends a special signal to the control unit 127. It is assumed that only one participant in time is speaking while others are silent. The control unit 127 guides the scaling units 125 so that the speaker's video stream is scaled into a big format and other video streams into a small format. These are explained in more detail later. These processed video streams are lead to the frame processing unit 128, which puts all input video streams into the same frame of one video stream. The output video of the frame processing unit 128 and the switched audio signal are encoded in the transmitter 129, which forms the output signal. This is transmitted through the uplink port $P_{OUT}$ parallel through the uplink channels $P_C$. There is an option for the insertion of a notification of recording, which takes place other device than the hub. The indication about recording is encoded into the signal of the recoding terminal. The decoded control signal of relevant terminal is led to the control unit 135', which guides the transmitter unit 129 to encode a chosen notification to the output signal. The notification is created by a special circuit 136. The recording and its notification will be explained more detailed later.

Figure 2:
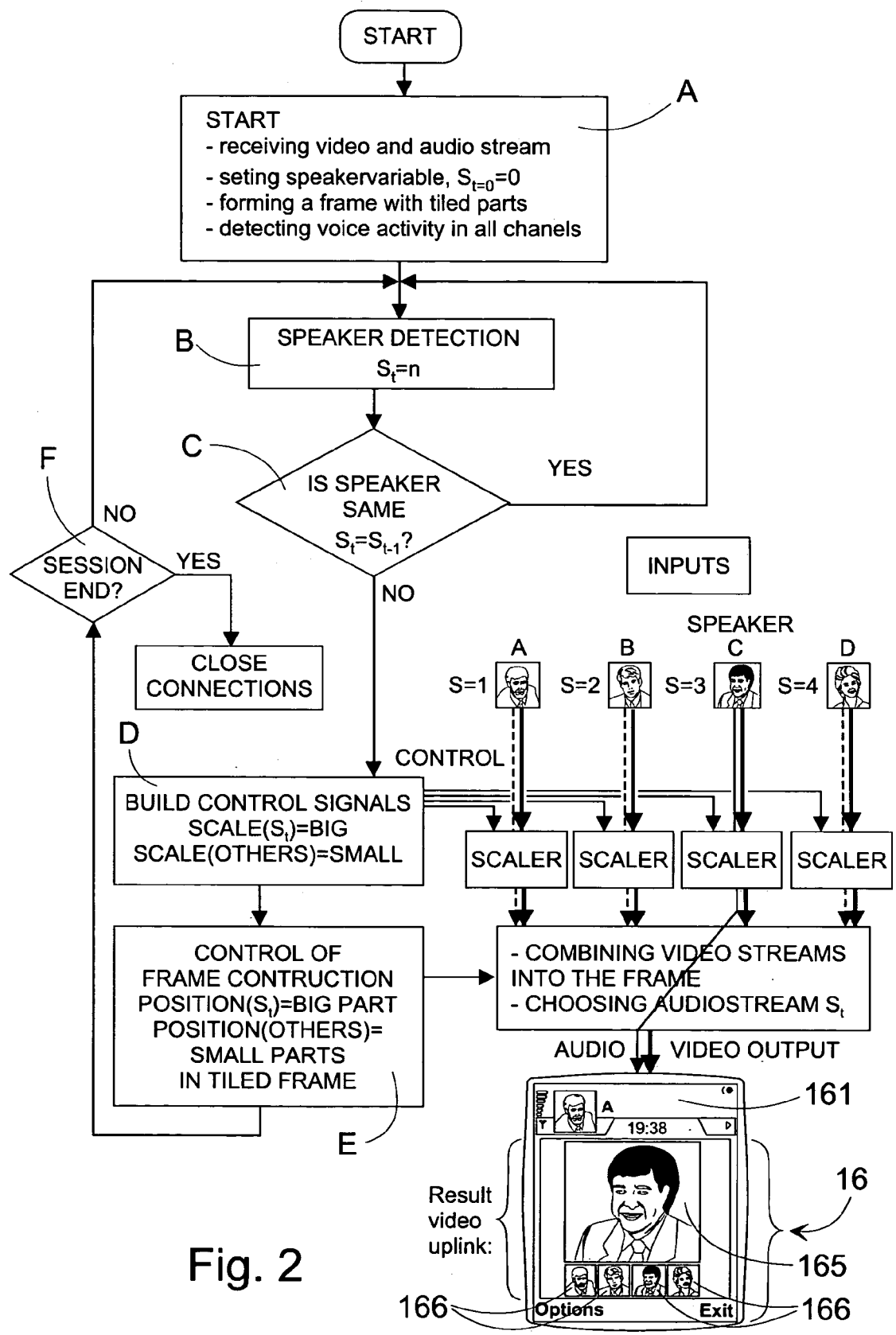
FIG. 2 presents a flowchart for controlling of video & audio streams in a hub

FIG. 2 shows the controlling of the videoconference hub. There are a lot of initialization processes, when the videoconference session starts. Few of those are listed in box A. Program flow waits that stable receiving video and audio streams are detected. The speaker variable S is initialized $S_{t=0}=0$. This variable declares, which one of the participants is speaking. The frame parameters are set. The voice activity detection (VAD) is started in each channel and the speaker variable (S) will get a new value $S_t=1, 2, 3$ or 4, whenever speaking is detected in any of the channels.

The program runs a loop, where first the speaker variable $S_t$ is compared to the old value $S_{t-1}$ (box B). If the value is same, the program flow returns after a set sequence to box B. If the speaker variable is different i.e. other participant has started to speak, this new value of the speaker variable is lead to the scaling control box D, which creates the scaling factors for the scaling units 125. The same speaker variable $S_t$ guides also the control of the frame construction, box E. This creates actual control signals for the processing unit 128, which combines pre-processed video streams from the scaling units 125 and selects audio stream to be forwarded.

In the example shown in FIG. 2, the speaker in turn is the participant C, S=3. Thus, the video stream of the participant C is scaled into the big format and his/hers audio is transmitted to the uplink port.

The unit 128 produces the result video with one frame 16, in which the image has different parts tiled as seen in FIG. 2. The header 161 is optional presenting a title and it is formed in the terminal as well as the possible drop menu titles. The big image part 165 of the frame presents a speaker in turn and the smaller image parts 166 present other or all participants of the videoconference. The output audio is selected as being the speaker's audio stream.

Figure 3:
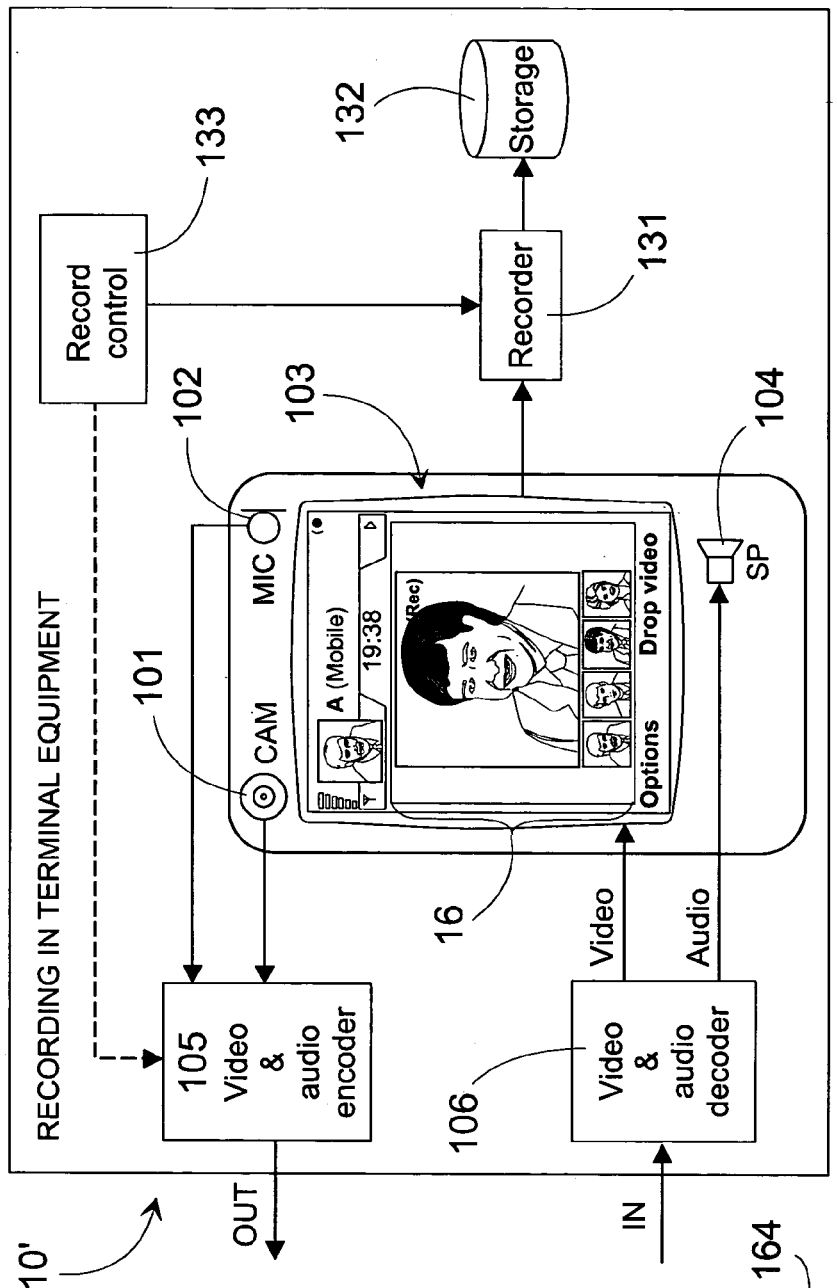
FIG. 3 presents a terminal equipment with a recording facility
Figure 4:
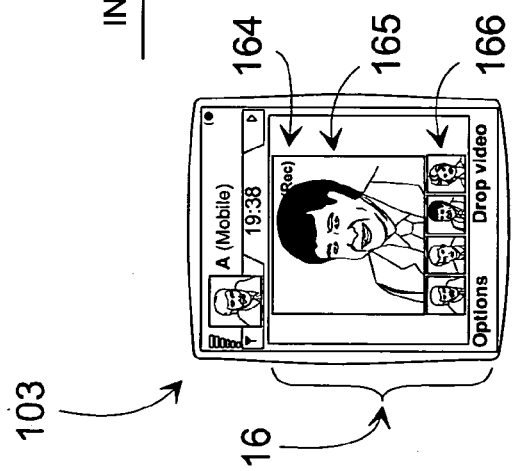
FIG. 4 presents a result video downlink when recording

FIG. 3 shows a modified terminal equipment 10', which includes a recording engine. It is assumed that the terminal is connected with a packet transfer mode to the network. The input signal (IN) is processed in the video & audio decoder 106, which feed video stream to the display 103 and audio signal to the speaker 104 (or phones). On the other hand the camera 101 creates video signal and the microphone 102 audio signal, which signals are encoded in the video & audio decoder 105 for output (OUT). There are additional functions for the recording. The received video & audio signals are led to recorder 131 for compressing them as files into the storage 132, eg. a hard disk. Recording is controlled by the record control circuit 133, which sends a special signal to video & audio encoder 105 for encoding also an indication about the recording. The notification itself is created in the hub (FIG. 1). This notification may consist graphics 164 (i.e. blinking red "REC") as shown in FIG. 4 and/or additionally tones. These notifications are created in unit 136 (FIG. 1). For uplink video stream a notification as graphics or tones is inserted to the video stream with audio to notify other participants of the recording.

The indication of recording has several modifications. In this example when the notification "REC" is combined onto the frame, the indication is sent as a chosen signal to the hub, which adds it onto the frame.

Figure 5:
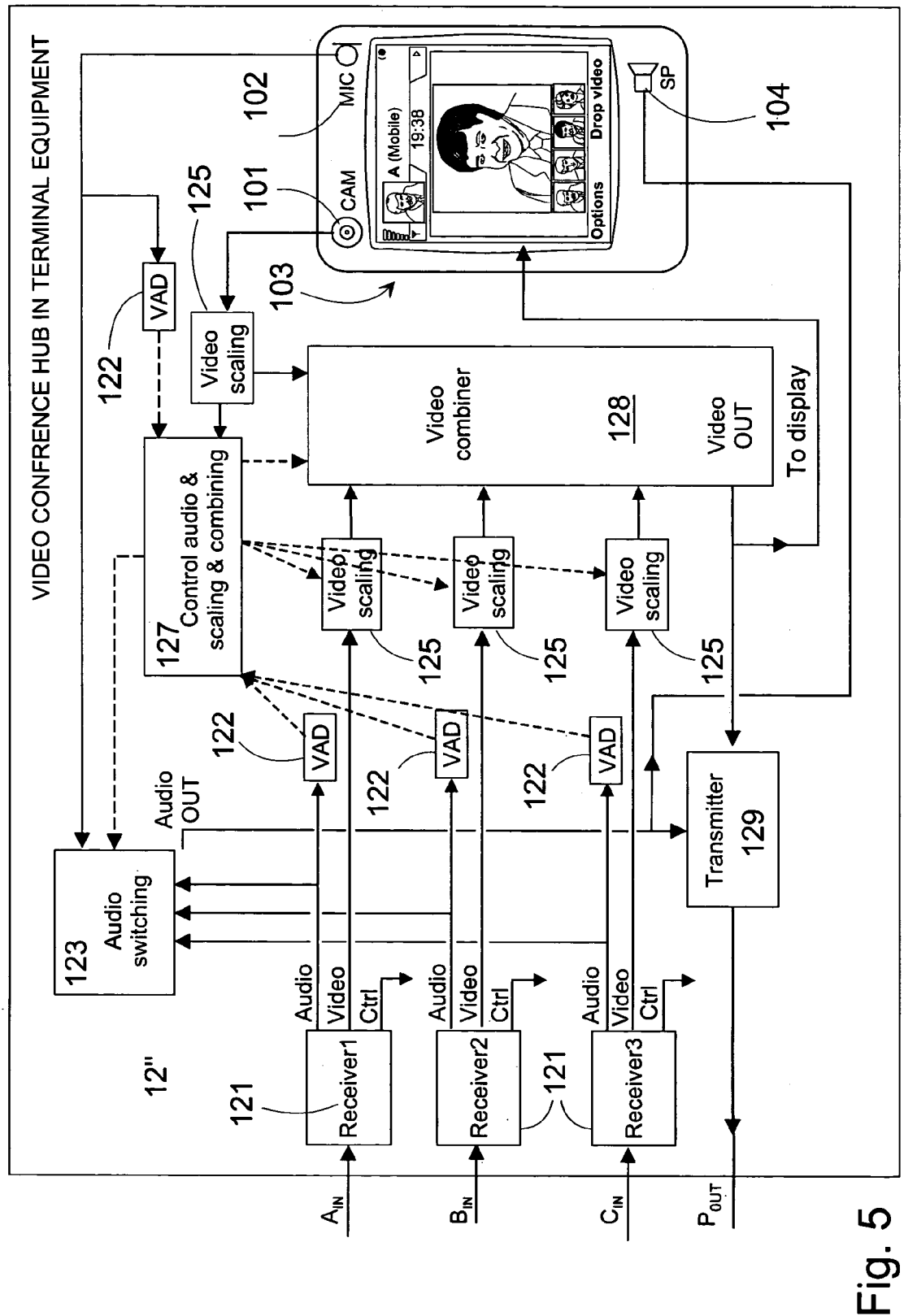
FIG. 5 presents a hub in a terminal equipment

The hub 12" for video conferencing can be implemented also in a special terminal equipment of one participant (here the fourth participant) as shown in FIG. 5. All functionally same parts are referred to with the same reference numbers as in previous Figures. The packet transfer mode and a wide band connection make such a terminal flexible. Thus, this modified terminal includes all parts for a hub, but also a terminal functionality. However, the optional circuits for recording notification are not shown.

This terminal equipment has a display 103, which is fed by the output signal of the video combiner 128, and the speaker 104, which is fed by the selected audio signal from the audio switching unit 123, respectively. The camera's video signal is processed by another video scaling unit 125 like incoming video signals. The audio signal of the microphone is fed to audio switching unit 123 like the other audio signals of other participants. The control unit 127 controls both video scaling and audio produced in the terminal itself as the incoming video & audio streams.

Figure 6:
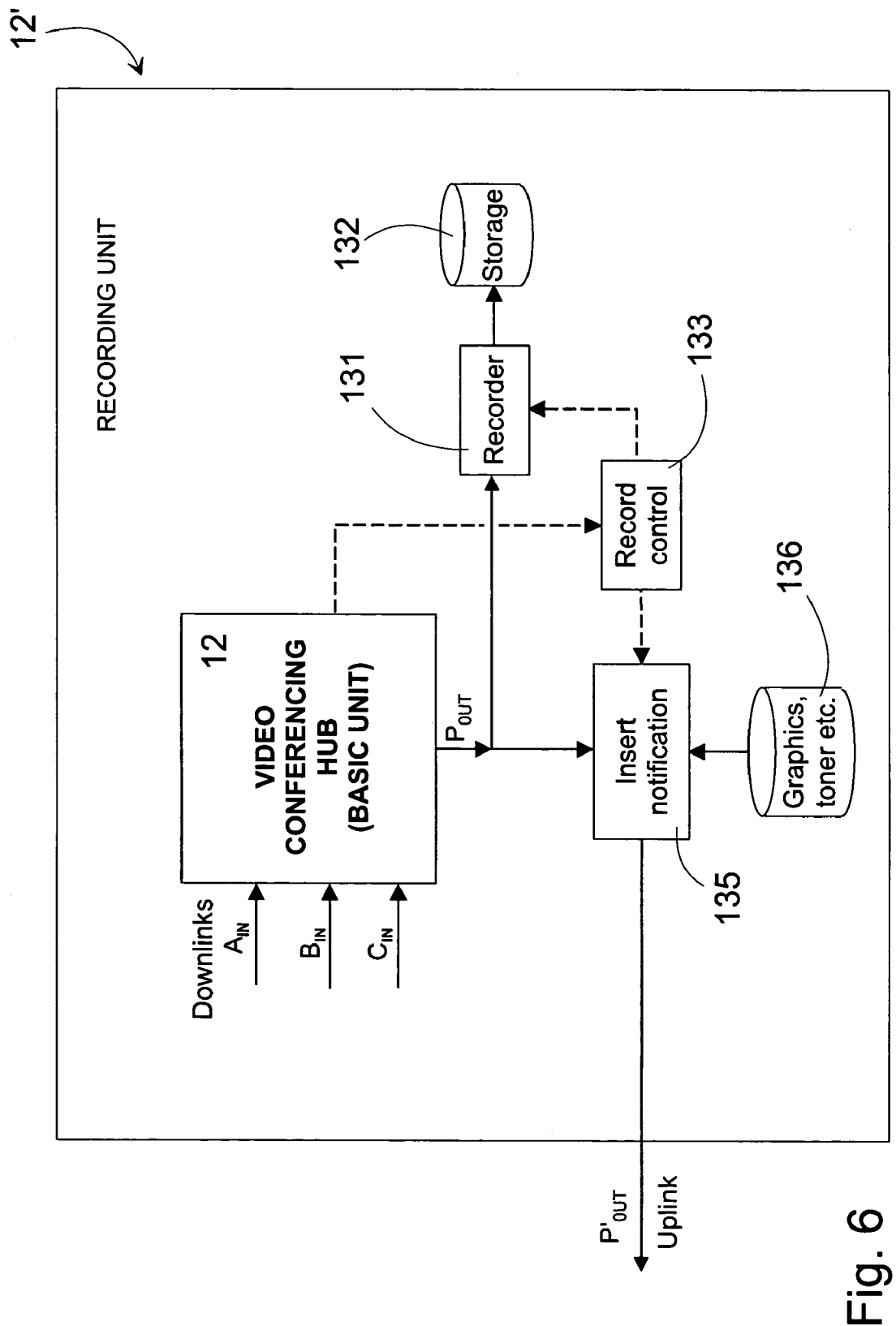
FIG. 6 presents a hub with a recording facility

The recoding functionality is very simple when implemented in a hub 12', see FIG. 6. The modified hub 12' includes the basic hub presented in FIG. 1 and recording unit like in FIG. 3. Recording is controlled by the record control circuit 133, which controls the recorder 131 and the notification insertion unit 135. This adds the chosen notification to the video and/or audio stream and the result is sent into the port P'out as uplink signal. The notification is created in unit 136. If the recording takes place elsewhere, a decoded control signal guides the record control 133 to control forward the notification insertion unit 135.

The invention claimed is:

1. A terminal equipment for participating and arranging a video conference, which has
    communication means for receiving and transmitting video and audio streams from and to other participants, and
    means for creating own video and audio stream to be transmitted and
    means for replay video and audio streams, and
    means for selecting one of all video streams according to the audio streams, and
    a hub engine for processing received video and audio streams to form one common uplink video and audio stream for all participants, where common uplink video comprises the selected one of all video streams.

2. A terminal equipment according to claim 1 characterized in that the terminal equipment is a camera phone.

3. A terminal equipment for participating and arranging a video conference, which has
- a plurality of downlink ports, each adapted to be coupled to a communication channel to receive videoconferencing signals from other participants each signal comprising video- and audio streams as an input,
- means for creating own video and audio stream as another input,
- means for replay the video and audio streams,
- an uplink port adapted to be coupled to a communication channel to transmit videoconferencing signal comprising video stream in a frame and an audio stream thereto as an output;
- an engine adapted to process the inputs to the output for a distribution to the uplink port and to said means for replay;
- a controller coupled to said engine for providing control signals thereto and having means for a voice activity detection (VAD) for each input;
- thereby selectively controlling the processing and distribution of videoconferencing signals at a hub in the terminal equipment in accordance with the voice activity detection.

4. A terminal equipment according to claim 3 characterized in that the engine is adapted to form a video stream combining the video streams of the participants into a frame with one bigger image part and with smaller parts, whereby the bigger part is scaled from the speaker's video stream and smaller parts are scaled from the other participants' images and the parts are tiled into the frame.

5. A terminal equipment according to claim 3 characterized in that the terminal equipment is a camera phone.

* * * * *